United States Patent

[11] 3,540,695

[72] Inventor Ivor John Taylor
560 Riverside Drive apt. 6G, New York, New York 10027
[21] Appl. No. 738,434
[22] Filed June 20, 1968
[45] Patented Nov. 17, 1970

[54] VACUUM VALVES
13 Claims, 12 Drawing Figs.
[52] U.S. Cl. ................................... 251/259,
251/284, 251/324, 251/334, 251/357, 251/367
[51] Int. Cl. ................................................. F16k 31/528
[50] Field of Search .......................... 251/251,
257, 259, 284, 318, 324, 325, 333, 334, 357, 362,
366, 367; 137/434

[56] References Cited
UNITED STATES PATENTS
| | | | |
|---|---|---|---|
| 1,467,816 | 9/1923 | Rope | 251/284X |
| 1,758,419 | 5/1930 | Wheaton | 251/259 |
| 2,654,560 | 10/1953 | Smith | 251/362X |
| 2,690,322 | 9/1954 | Stansfield | 251/324 |

Primary Examiner—William F. O'Dea
Assistant Examiner—David R. Matthews

ABSTRACT: The invention relates to fast acting valves suitable for use in high vacuum systems. The valves employ a piston element which reciprocates in the cylindrical bore of the valve casing. In one valve type the piston forms a high compression vacuum seal at an end shoulder of the valve bore by utilizing a narrow section-sealing member retained in the piston end face. In a further valve type a vacuum seal is formed within a detachable end sleeve withdrawable from the valve casing, the sleeve construction enabling high quality vacuum sealing under conditions of extensive usage by reduction of frictional wear on the sealing member. Reciprocal motion of the piston is obtained from a rotary movement of an actuating spindle with crank disc. The crank disc is located within a bored recess in the valve casing to allow absorption of operating stresses by the casing and permit the use of an efficient vacuum sealing arrangement for the spindle. A crank pin and external stops arrangement enables the valves to be locked in their open and closed positions.

FIG.2
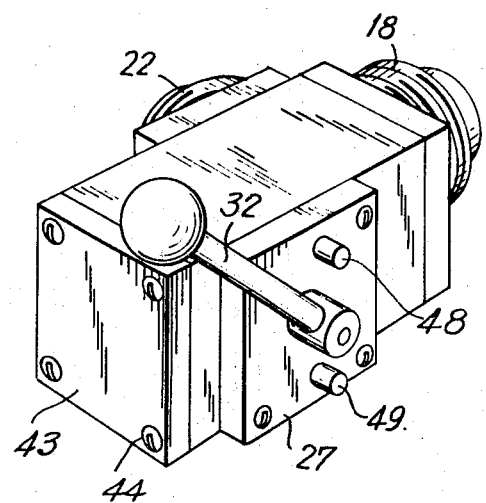
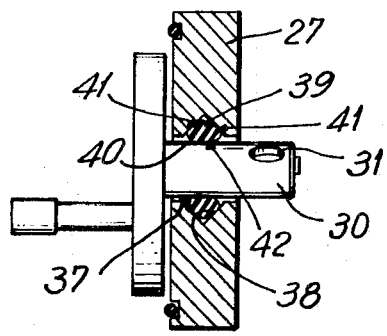
FIG.5

VACUUM VALVES

This invention relates to valves and to that field of valves hereafter referred to as vacuum valves which are suitable for use in high-vacuum systems.

Objects of the valve include the devising of

1. A valve which is sufficiently leak free to be capable of sustained operation in high-vacuum systems.
2. A valve having a quick and single-movement operation—this feature being intended to anticipate and meet the requirement of making many repeated cycles of operation (which may be involved, for instance, in the production line vacuum testing of various products).
3. A valve which is locked when in the closed or open positions so that the valve cannot be opened or closed as a result of pressure differentials across the valve ports.
4. A valve having a single mechanism of but one rotating and one sliding part and which, by virtue of its construction, is capable of effecting a firm and locked vacuum seal yet retaining the feature of easy release.
5. A valve whose sealing and release is obtained without the need of pressure springs or other such devices and whose locking action obviates the necessity of any complicated locking mechanism or indeed of any extra mechanism devoted to the object of locking the valve.
6. A valve having large port apertures (to achieve high pumping speed through the valve) together with a small size and compact form for the valve unit.
7. A valve whose mechanism can be readily removed from the valve body for servicing or replacement without removing the valve body from the vacuum system, into which it may therefore be permanently installed.

As is well known, valves which are fully suitable for fluid control are in general wholly unsuitable for use in high-vacuum systems due to inadequacies in the firmness of sealing at the valve ports and, most often, because of inadequate sealing of the valve body or the valve operating mechanism against external leakages into the valve.

A valve for high-vacuum use has to be substantially leak-free. For example, a leakage totaling 1cc. of air over a whole day of operation corresponds to an equivalent leakage of 760 million cc. for a vacuum system operating at $10^{-6}$ Torr vacuum or, in other terms, corresponds to a lead rate of more than 7,600 cc. per second at this pressure of vacuum. Such an enormous leakage could completely overwhelm a vacuum system attempting to produce and maintain this degree ($10^{-6}$ Torr) of vacuum.

Modern leak-detection methods at present enable leaks of the order of $10^{-12}$ atmospheric cc. per sec. to be detected and a valve suitable for use in high-vacuum work necessarily must be leak-free in operation to at least this extent and which is the capability of the valve hereafter described. Vacuum valves therefore require the following features:

a. that they provide a high compression sealing within the valve to isolate the valve ports; and
b. that they use shaft or stem seals which are specifically, and often elaborately, designed to avoid leakage into the valve.

In a reciprocating piston type of valve, which is perhaps the simplest valve concept, the piston is generally operated by means of a shaft through the valve body and thus a basic problem for vacuum valves of this type is eliminating shaft leakages.

A translational movement of a shaft through a seal invariably introduces a leak into the valve due to a combination of two effects. Firstly, when the shaft passes through the seal a quantity of air which was absorbed in the surface layers of the shaft is introduced into the valve. These surface layers then "out-gas" into the vacuum environment. No form of seal which permits direct translational motion of the shaft from air into the vacuum region (however well this seal may be devised) will be able to fully prevent this type of leakage.

Secondly, when a shaft undergoes such translational movement a leakage may occur as the contact between the seal and the shaft momentarily "breaks away" as translational motion is started through the seal.

In general, therefore, valves utilizing a translational movement of a shaft through a seal are basically unsuitable for use as vacuum valves. The contention that such valves might be made satisfactorily leak-free for many vacuum uses rests on minimizing the two effects mentioned above.

Thus, necessarily, the shaft movement should be a small one, and one involving a part of the shaft that is well polished and protected to remain clean and scratch free. Any dust or dirt that may accumulate on a part of the shaft projecting beyond the casing in one axial position of the piston is liable, in the other axial position of the piston, to be drawn within the seal and thus further impair the sealing characteristics of the arrangement.

The imposed requirements of a small and slow movement are opposed to the very desirable features of substantial piston movement and quick operation. A substantial piston movement is quite necessary for a valve having large port apertures so that the apertures may be adequately cleared to permit unrestricted flow through the valve and, since under vacuum conditions the flow rate through the valve is proportional to the cubic power of the aperture size, a large aperture is an important requirement for a vacuum valve.

One specific design to overcome shaft problems employs a bellows, one end of which is sealed to the piston and the other end to the valve body. The shaft then operates inside the sealed bellows unit and shaft leakage is avoided. Such bellows valves are well known and are extensively used in high-vacuum work.

Such valves however have their own inherent disadvantages. The metal bellows material is very thin to obtain the necessary flexibility and should it crack through fatigue effects or corrode away (if corrosive gases are being handled for instance) then once again a shaft leak would ensue.

Methods of "backing-up" the bellows seal have been devised serving to illustrate that the shaft seal can still be of concern even in this type of valve.

A more apparent disadvantage of the bellows type of valve lies in its operation. The piston is generally actuated by a screw threaded shaft so that the seal within the valve may be made firm and locked. The operation of a screw-threaded shaft is necessarily slow and thus such valves, intrinsically, are not quick acting.

When such valves are made quick acting, as is generally done by means of a cam or toggle mechanism to withdraw the shaft against some form of spring tension, then the firmness of the internal seal depends entirely upon the spring tension. Although now quick acting, such a valve cannot be firmly tightened and is not locked.

The relevance of the above discussion is now apparent in that it illustrates that the previously stated objects of the valve invention hereafter described are not met by, nor are mutually compatible with, existing forms of reciprocating piston vacuum valves.

In contrast to translational motion of a shaft through a seal, rotational motion of a shaft in a seal, without any accompanying translation motion, can be made leak-free for vacuum use.

This is because the previously mentioned first effect contributing to shaft leakage does not arise and the second effect is substantially smaller when the shaft merely undergoes a small rotation in the seal and is not moving through it.

In the valve hereafter described shaft leakage is effectively eliminated as a cause of concern by virtue of the valve construction, which requires that the shaft seal is one which only involves the sealing of a relatively small and slow rotational motion, and by the form of the seal design and assemblage of components relating to the vacuum sealing of the shaft. The valve construction also incorporates a tight internal vacuum sealing of the piston element to isolate the valve ports and also provides a locked seal which is effected with a quick acting single operation. Other features relating to the previously stated objects of the invention will also become apparent from later description.

Two embodiments of the invention will now be described in detail by way of example with reference to the accompanying drawings, in which:

FIG. 2 is an external perspective view of the valve of FIG. 1;

FIG. 5 is a detail cross-sectional view illustrating the vacuum seal for the rotary spindle of the valve of FIGS. 1 to 4;

Figure 1:
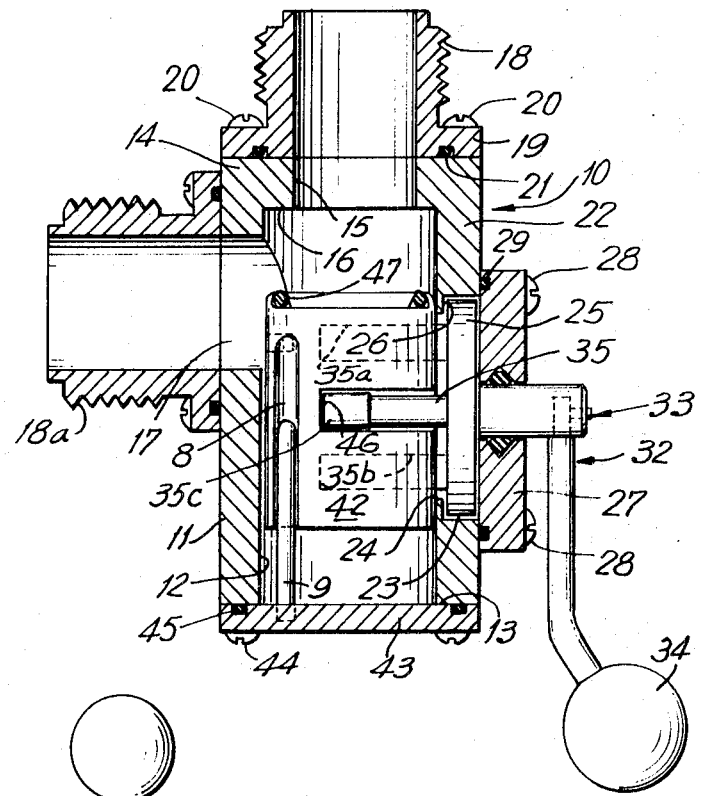
FIG. 1 is a cross-sectional view of the valve constituting a first embodiment of the invention.

Referring now to FIGS. 1 to 10 the valve casing is indicated generally at 10 and comprises a piece of square section material 11 which is provided with a bore 12 extending from one end 13 to an end wall 14 at the other end thereof, the end wall 14 being provided with a first port 15 which is of lesser diameter than the bore 12, the port being surrounded by an annular seating surface 16 at the end of the bore 12. One of the walls of the member 11 is provided with a second port 17 which, as will be seen from FIG. 1, is placed below the annular seating surface 16.

The member 11 may be metal although for special uses, which may for instance involve the handling of corrosive gases, other suitable materials such as plastics material may be used.

The material is deliberately chosen of square section because for a small size of valve it enables the largest diameter of bore 12 to be used and the largest diameter of the ports 15 and 17 together with other desirable constructional features mentioned later.

The port 15 is associated with a screw-threaded coupling 18 of known type provided with a flange 19 which is secured to the member 11 by screws 20 and is vacuum sealed thereto by an O-ring 21 received in a groove in the flange 19. The port 17 is provided with a screw-threaded coupling 18a which is in all respects similar to the coupling 18.

In a wall 22 of the member 11 there is provided a cylindrical, outwardly opening, recess 23 which communicates with the bore 12 through a cylindrical aperture 24 of lesser diameter than the recess 23. Received in the recess 23 is a crank disc 25 which is a good fit in the recess so as to be rotatable therein and which is held in position by means of a shoulder 26 between the recess 23 and the aperture 24 and by a cover plate 27 which is removably secured to the wall 22 by screws 28 and which is vacuum sealed to said wall by an O-ring 29 received in a groove on the underside of the cover plate.

Figure 3:
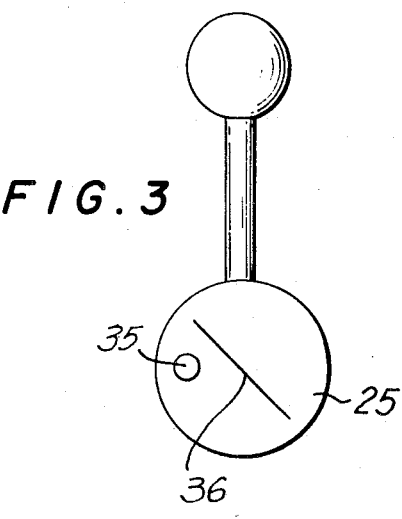
FIGS. 3 and 4 are detail elevations of the spindle, operating means and handle of the valve of FIGS. 1 and 2.
Figure 4:
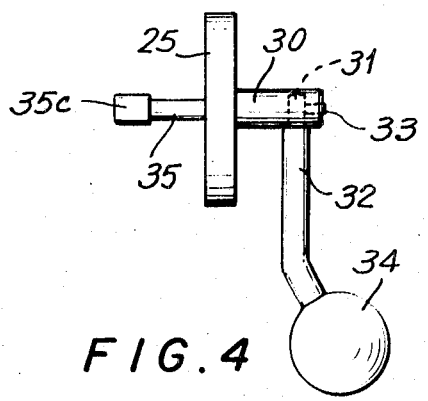

Referring particularly to FIGS. 3 and 4, the crank disc 25 has secured thereto an operating spindle 30 which is coaxial with the disc, the spindle being bored at 31 to receive the end of a handle 32, said end being held in position by a setscrew 33. The handle 32 is provided at its free end with an operating knob 34. The disc 25 is provided on its surface remote from that connected to the spindle 30 with a crank pin 35 which, as clearly shown in FIG. 3, is offset from the central axis 36 of the disc 25 and the spindle 30 and has a portion 35c at the free end and which is of slightly larger diameter than the remainder of the pin.

Referring now to FIG. 5, the spindle 30 passes through a central bore 37 in the cover plate 27. The bore is provided with an annular groove 38 which is of wide, V-shape in cross section, the angle of the V being approximately 90° and the groove accommodates on O-ring seal 39. The depth of the groove 38 is such that when the spindle 30 is inserted through the O-ring 39 the latter forms a tight vacuum seal around the spindle.

The part of the spindle extending within the seal may be specially finished to form as perfect a cylindrical surface as practicable and thus have a high surface polish so as to provide optimum vacuum sealing of the said spindle.

The compression of the O-ring 39 results in it having three zones of contact with the cover plate and the spindle. Thus the ring has two zones of contact 41 with the cover plate along the sides of the groove and has a third zone of contact 42 with the spindle. The two separate zones of contact 41 provide separate seals between the ring and the cover plate and also by their frictional contact with the cover plate act to prevent rotation of the ring within the groove 38 so that the only rotational movement in the seal is between the smooth spindle surface and the inner surface of the O-ring.

Preferably, the O-ring 39 is of comparatively hard material, such as neoprene or butyl rubber with a hardness of 50 to 60 Shore (durometer), and the O-ring 39 and the spindle lightly lubricated with vacuum grease or a suitable vacuum oil e.g. D.C. 702 Silicone Oil, Dow Corning Corporation.

With the sealing member contained within a groove in the cover plate, the spindle may be inserted into its seal with minimum risk of damaging (i.e. scratching or marking) the specially finished and polished surface of the spindle, and hence there is little risk of damaging or impairing the vacuum seal during assembly of the component parts.

To minimize the relative movement of the spindle and the sealing member the spindle 30 is made of comparatively small diameter since it is well supported by accurate location of the crank disc 25 in the recess 23 and by the transverse location of the crank disc between the shoulder 26 and the cover plate 27. Due to this location of the spindle 30 by the crank disc 25 there is little force tending to deform the O-ring 39 as the valve is operated and this helps to maintain the effectiveness of the vacuum seal between the cover plate and the spindle 30. Moreover, the spindle 30 need only project a small distance from the cover plate 27 so as to reduce the transverse stresses on the spindle 30 and the O-ring 39 as the valve is operated.

The arrangement is such that the spindle, the sealing member and the cover plate form a separate subassembly which can be positioned and removed without disturbing the relative positions of the other parts of the valve or parts effecting the vacuum sealing of the spindle. The subassembly also includes the operating means, the stop means, and a handle or other means for rotating the spindle.

Referring now to FIG. 1, a piston 42 is slidably mounted in the bore 12. After insertion of the piston into the bore the latter is closed by an end plate 43 held in position by screws 44 and having a sealing ring 45 to vacuum seal the end plate to the member 11. The piston 42 is movable between two extreme positions in the bore 12 by means of the crank pin 35 which is received in a slot 46 in the piston. The crank pin and the slot are made sufficiently long and deep respectively to provide adequate bearing surfaces between the pin and piston.

The bearing surface of the pin is on the portion 35c which has a length of approximately 30 percent of the total pin length. The piston is thus driven in the region of its axis and spinning motion which can arise due to off-axis drive is removed from the seating motion of the piston. Also, to prevent spinning of the piston due to the uneven weight distribution resulting from the presence of the slot 46, the piston is provided with an off-axis hole 8 into which engages a guide pin 9 mounted similarly off-axis and force-fitted into the end plate 43. Spinning motion of the piston, which would be detrimental to the vacuum sealing of the piston member, is thus prevented.

As spindle 30 is rotated the crank pin 35 will move across the slot 46 and move the piston between its extreme positions, the pin driving the piston directly without the use of intermediate linkages. When the crank pin is in the position indicated in dotted lines at 35a in FIG. 1, the piston will be at the upper of its extreme positions and a sealing ring 47 will engage the annular seating face 16 thus mutually isolating the ports 15 and 17. It will be seen that when the crank disc is in this position, the crank pin 35 will be in a dead-center position; that is to say the crank pin will be in the position shown in FIG. 3 so that a line through the pin and the axis 36 lies along the axis of the bore 12. The piston 42 will thus be locked in its upper extreme position and cannot be moved except by rotation of the handle 32. The piston 42 cannot be moved by pressure differences between the ends thereof because of the dead-center position of the crank pin 35.

The cover plate 27 is provided with stops 48 and 49 as shown in FIG. 2 and when the handle 32 engages the stop 48 the piston 42 is in its upper extreme position as described above. The stop 48 is so located as to prevent any further rotation of the spindle or crank disc 25 over and above that required to move the piston 42 to its upper extreme position and to cause sealing engagement between the ring 47 and the annular seating surface 16 as will hereinafter be described. If the handle 32 is now rotated in an anticlockwise direction in FIG. 2 until it reaches the stop 49, the piston 42 will be in its lower extreme position and the crank pin 35 will be in the position shown in dotted lines at 35b in FIG. 1. In this position, also, the crank pin 35 will be in a dead-center position and therefore the only way in which the piston can be moved is by rotating the handle 32, the piston cannot be moved by differences in pressure across its ends. It will be seen that the valve is positively locked when in either of its closed or fully open positions.

Figures 6, 7:
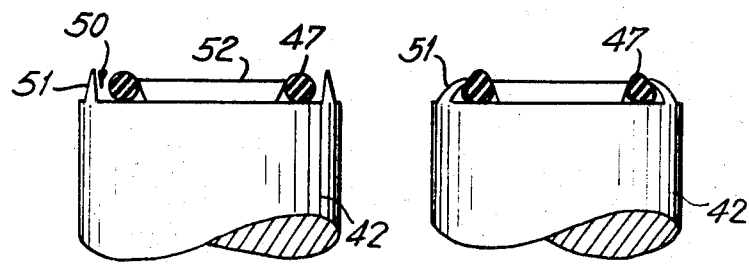
FIGS. 6 and 7 are detail views illustrating two stages in the assembly of the annular sealing member on the end face of the piston element of the valve of FIGS. 1 to 5.

Referring now to FIGS. 6 and 7, the O-ring 47 is retained in a groove 50 in the end face of the piston and formed between a peripheral rib 51 and a central spigot 52 whose periphery is under cut as clearly shown in the FIGS. The depth of the groove is approximately 80 percent of the sectional diameter of the O-ring. After the O-ring has been placed in the groove as shown in FIG. 6, the peripheral rib 51 is folded inwardly as shown in FIG. 7 to trap the O-ring in the groove. The rib is initially of a height which is greater than the diameter of the O-ring 47 so that as it is folded inwardly as shown in FIG. 7 it does not tend to bite into the O-ring but merely holds the O-ring in position and prevents it from being withdrawn by suction effects within the valve. The resulting groove is of generally trapezoidal or wedge section and the O-ring 47 initially projects from the groove as shown in FIG. 7.

Figure 8:
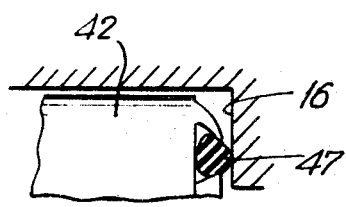
FIGS. 8, 9 and 10 are views illustrating the sealing operation of the sealing member of FIG. 8 when the piston element moves into one extreme position, i.e. its sealing position.
Figure 9:
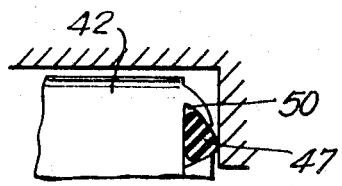
Figure 10:
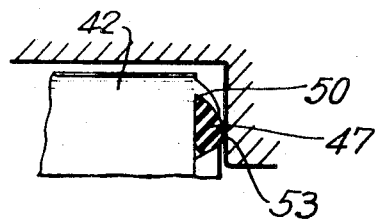

The sealing operation of the O-ring is illustrated in FIGS. 8, 9 and 10. Since the O-ring initially projects from the end face of the piston, as the piston is moved to its upper extreme position, i.e. as the crank pin 35 approaches the position 35a, the O-ring will contact the annular seating 16 as shown in FIG. 8. As the piston continues to move to the right in FIG. 8, the O-ring becomes deformed and begins to spread into the groove 50 as shown in FIG. 9. At the end of the sealing operation, the O-ring substantially fills the groove 50. The trapezoidal or wedge section of the groove 50 allows adequate room for movement of the O-ring material as the O-ring is compressed as shown in FIGS. 8 to 10 so that the elastic properties of the O-ring are not impaired and it therefore has a long operational life. Since the forward motion of the piston is limited to an end position defined by the dead-center position of the crank pin, the O-ring compression does not exceed a predetermined design value.

A tight sealing is highly desirable in a vacuum valve and in the present arrangement, where a screw operation is not being used, there is a limitation upon the force that can be exerted by the piston to provide a tight seal. To obtain a high sealing pressure it is therefore necessary to use a narrow sealing ring 47 in contrast to the use of thick rings or large area gaskets. As the piston is a sliding fit in the bore of the valve and piston motion is well defined, thin rings or gaskets can be satisfactorily employed.

Taking a specific example, if the O-ring 47 has a diameter of three-fourth inch and sectional thickness of one-sixteenth inch there is ring contact as indicated at 53 in FIG. 10 over an area of one-tenth square inch.

In the specific embodiment described, the mechanical advantage of the operating mechanism of the valve is approximately 7:1 for a conveniently short length of operating handle so that, even for a manually applied force of some 10 ounces at the handle, the sealing pressure between the O-ring 47 and the annular seating surface 16 will nevertheless be approximately 40 p.s.i. This pressure is sufficient to produce a compression of more than 30 percent cross section of the above O-ring even for the maximum hardness of O-rings normally supplied commercially (90 Shore).

It is apparent that to utilize the pressure at the seal obtainable with this valve construction it is preferred to use an O-ring of at least 60 Shore hardness in the piston end face. A tight seal is therefore obtained which is comparable to that achieved in valves utilizing screw-threaded operating means and which have the disadvantage of being extremely slow in operation as compared with the present arrangement.

The use of a narrow ring of flat gasket material, though also possible, is restricted in general by the lack of easy entrapment in the piston end face to provide retention yet allow room for elastic deformation. Specially moulded rings for this purpose have no advantage as such over the commercially available torroidal rings (O-rings) for which a simple entrapment as described above can be used.

Figure 11:
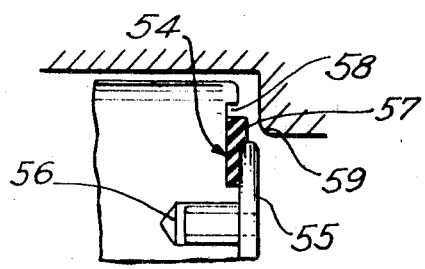
FIG. 11 is a view similar to FIG. 8 but showing a flat, annular sealing member mounted on the piston element in place of the ring shown in FIGS. 6 to 10.

In this connection however, an arrangement using flat gasket material for a sealing member and which has proved very satisfactory with the valve herein described is shown in FIG. 11 in which the central region of an annular flat gasket is secured rigidly in an annular groove 54 in the end face of the piston by means of an end cap button 55 the shank of which is force-fitted into an axially bored hole 56 in the piston end face. The flat gasket material is thus retained in the piston end face, the central region is inert, and the outer annulus 57 of the gasket then comprises the required narrow sealing ring. On sealing, the narrow annular ring section undergoes elastic deformation into the provided space 58 at the outer edge of the ring. The inner edge 59 of the seating surface is rounded to prevent shearing of the gasket material when the seal is made.

The provision of the detachable end plate 43 and the cover plate 27 readily enables the piston 42 to be removed from the valve body for maintenance or replacement without requiring the removal of the valve body itself from any equipment to which it may be connected by the couplings 18 and 18a. Furthermore, the cover plate 27 with the spindle 30, handle 32, crank disc 25 and crank pin 35 form a subassembly which may easily be removed and replaced without having to disturb the parts effecting the vacuum sealing of the spindle 30.

Figure 12:
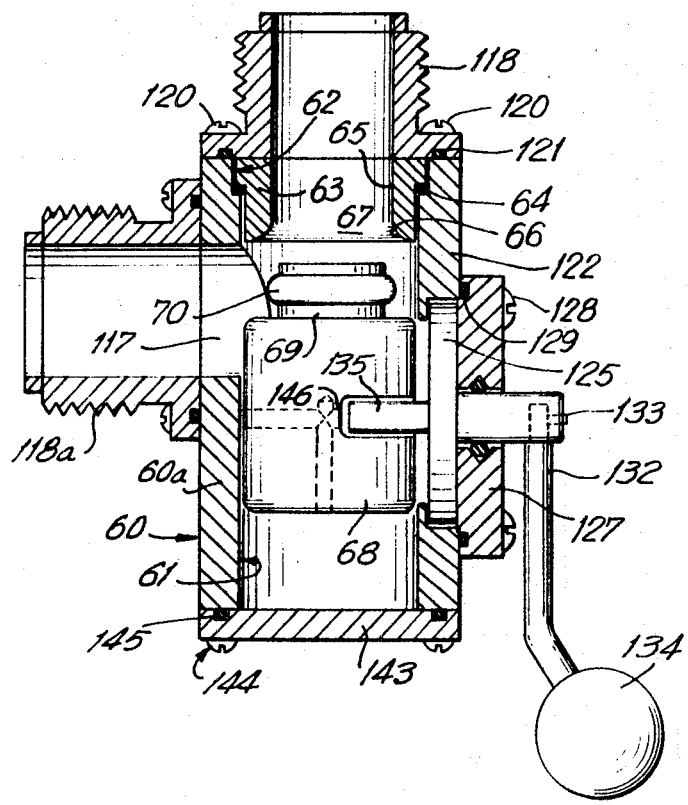
FIG. 12 is a view similar to FIG. 1 of a valve constituting a second embodiment of the invention.

Referring now to FIG. 12, this shows a second embodiment of the invention. This second embodiment differs from the first embodiment solely in the form of the piston and in the arrangement whereby the piston can seal the first port in the valve casing. Parts in FIG. 12 which are identical to corresponding parts in FIGS. 1 to 11 are indicated by the reference numerals used in FIGS. 1 to 11 with the prefix 1.

Referring to FIG. 12, the valve casing 60 comprises a piece 60a of square section material which has a bore 61 extending from end to end thereof. One end of the bore is closed by an end plate 143 held in position by screws 144 and vacuum sealed to the end of the casing by an O-ring seal 145. The other end of the bore 61 is provided with a counterbore 62 and is furnished with an inserted sleeve 63. The sleeve 63 is vacuum sealed to the casing 60 by means of an O-ring seal 64 inserted between opposed shoulders on the casing and the sleeve.

The sleeve 63 has a cylindrical bore 65 and at its inner end this bore diverges at 66 to provide a convergent entry into the bore 65 from the bore 61 of the valve. The bore 65 provides an annular seating surface as will be described and also a first port 67 of the valve. The sleeve 63 is held in position by means of the coupling 118 which is held in position in turn on the casing by screws 120 and is vacuum sealed to the casing by means of an O-ring seal 121.

A piston 68 is slidable in the bore 61 and is provided with a slot 146 in which is received the crank pin 135 of operating mechanism which is substantially identical to that shown in FIGS. 1 to 10.

The piston 68 has a stem 69 in which is formed a peripheral groove which carries an O-ring seal 70. When the O-ring 70 is uncompressed it has a diameter which is slightly greater than the diameter of the bore 65 in the sleeve. The piston may be moved to close the valve by rotating the handle 132 and thus moving the piston 68 as described in relation to FIGS. 1 to 10 until the O-ring seal 70 enters the bore 65. The entry of the O-ring is facilitated by the diverging portion 66 of the bore and when the O-ring 70 is fully in the bore 65 it is radially compressed and provides a vacuum seal for the port 67. When the handle 132 is turned to withdraw the O-ring 70 from the bore 65 there is communication between the first port 67 and the second port 117. As in the previous embodiment the valve is locked when in the fully closed or fully open positions.

For the embodiment to provide a good vacuum seal there are several necessary requirements. The first of these is that the O-ring 70 must be made of a material which is sufficiently hard that is does not deform or extrude from its annular groove as the O-ring is forced into the bore 65. The approximately 7:1 mechanical advantage of the operating mechanism readily permits a reasonably hard O-ring to be forced within the bore 65 and radially compressed and thus it is preferred to use for the material of the O-ring a neoprene or butyl rubber of at least 50 to 60 Shore (durometer) hardness, the O-ring being lightly lubricated with vacuum grease.

Secondly, the bore 65 of the sleeve must have a smooth and high quality finish. The fact that the sleeve is removable from the casing makes it comparatively easy to obtain such a finish and also to obtain the divergent portion 66. The sleeve may be made from any desired material and particularly from a material which is different from that of the valve casing.

Thirdly, as frictional wear is the usual limitation on the satisfactory use of O-rings for such sliding seals, and since the frictional wear increases with the O-ring hardness, it is necessary to make the sleeve from a material having low frictional properties in relation to the O-ring 70.

A preferred material for the sleeve is thus nylon or a material such as Teflon or P.T.F.E. (Registered Trade Marks for polytetrafluroroethylene) which has extremely low frictional properties and which, by also having a very low vapor pressure, is a very satisfactory material for vacuum use. With an insertable sleeve constructed of this material the wear and damage to the O-ring 70 is minimal.

The fact that the sleeve 63 is readily detachable from the valve casing means, additionally, that it may readily be replaced should it required service.

The sealing arrangement for the port 67 in the embodiment of FIG. 12 differs from the corresponding sealing arrangement of the valve of FIGS. 1 to 11 in that it is not capable of effecting such a tight, static, compression seal. The advantage of the second embodiment, employing a sliding seal, is that the machining accuracy of the piston and the length of the valve bore is rendered substantially less important and it is also not necessary to prevent possible spinning motion of the piston as in the first embodiment.

Since there is a reasonable mechanical advantage of the operating mechanism it is still possible to obtain adequate radial compression of the desired form of O-ring 70 to effect a good tight vacuum seal.

It will be seen that the invention provides simple fast-acting valves which are useful in high-vacuum systems and which have the advantages set forth above over previously used vacuum valves.

I claim:

1. A valve comprising:
   a. a casing having a bore and first and second ports which communicate with the bore, the first port communicating with the bore at an end thereof;
   b. a piston element slidable within the bore between two extreme positions in one of which it mutually isolates the ports and in the other of which it allows the ports to communicate through the bore;
   c. an annular seating surface surrounding the first port;
   d. a resilient, deformable, annular sealing member housed in an annular groove in the piston element, the member, when uncompressed, projecting beyond the mouth of the groove for sealing engagement with said seating surfaces;
   e. a valve-operating spindle extending through, and mounted for rotational movement in, a wall of the casing and having an outer part projecting outwardly of the casing;
   f. a crank disk extension of the spindle, located in a recess in the wall of the casing;
   g. operating means within the casing connecting the crank disc and the piston element to effect reciprocating motion of the piston element in the bore between said extreme positions when the spindle is rotated and such that when the piston element is in either of said extreme positions it cannot be displaced by pressures in the bore acting on it, said sealing member being compressed by, and sealingly engaging, said seating surface when the piston element is in said one extreme position;
   h. stop means for limiting the rotational movement of the spindle to that required to displace the piston element between said two extreme positions;
   i. a cover plate secured to the casing and through which the spindle extends; and
   j. a sealing ring held against rotational movement and interposed between the cover plate and the spindle to provide a seal between the cover plate and the spindle.

2. A valve according to claim 1 wherein the operating means comprises a crank pin on the crank disc and wherein the stop means serves to limit rotation of the operating spindle to rotation between two dead-center positions of the crank pin, which dead-center positions correspond to the two extreme positions of the piston element.

3. A valve according to claim 1 where the crank disc is located in said recess between a shoulder in the casing wall and said cover plate which is removably secured to the valve casing.

4. A valve according to claim 2, wherein the crank pin is received in a slot in the piston element.

5. A valve according to claim 1 wherein the operating spindle passes through a bore in the cover plate and wherein said sealing ring is an O-ring seal received in a V-shaped groove in said bore and engaging the operating spindle so that the O-ring is deformed to generally triangular section and has a single zone of contact with the spindle and two separate zones of contact with the sides of the groove.

6. A valve according to claim 1 wherein the outer part of the spindle carries an operating handle and wherein the stop means comprises two pins mounted on the cover plate and arranged to be engaged by the handle at said extreme positions of the piston element.

7. A valve according to claim 1 wherein the cover plate and crank disc form a detachable subassembly which comprises the operating means and stop means and the vacuum seal for the spindle.

8. A valve according to claim 1 wherein the annular seating surface is directed to an end face of the piston element and wherein the annular groove carrying the annular sealing member is in said end face.

9. A valve according to claim 1 wherein said annular groove is of generally trapezoidal section to retain the annular sealing member and is substantially filled by said sealing member when the latter is compressed by engagement with the seating surface when the piston element is in its one extreme position.

10. A valve according to claim 1 wherein the annular seating surface is cylindrical and wherein the annular sealing member enters the cylindrical seating surface when the piston is in said one extreme position.

11. A valve according to claim 1 including a sleeve insert mounted in the casing and vacuum sealed thereto, the bore of the sleeve insert providing the first port and the annular seating surface.

12. A valve according to claim 1 wherein the valve casing is formed of a piece of square section material and wherein the first port is formed in an end of the valve casing and the second port is formed in a wall at right angles to said end wall.

13. A valve according to claim 1 wherein the end of said bore remote from the first port is closed by a removable end plate.